United States Patent [19]

Noesen

[11] 4,098,449
[45] Jul. 4, 1978

[54] TERMINAL CONNECTION FOR ALUMINUM CONDUCTOR AND METHOD OF MAKING

[75] Inventor: Stanley J. Noesen, Hendersonville, N.C.

[73] Assignee: General Electric Company

[21] Appl. No.: 782,101

[22] Filed: Mar. 28, 1977

[51] Int. Cl.² ............... B23K 21/00; H01R 13/20
[52] U.S. Cl. ............................. 228/115; 29/628; 228/904
[58] Field of Search .............. 228/115, 116, 904; 29/628; 174/94 R

[56] References Cited
U.S. PATENT DOCUMENTS

| | | | |
|---|---|---|---|
| 1,490,504 | 4/1924 | Boothman | 204/286 |
| 3,191,276 | 6/1965 | Gwyn | 228/115 X |
| 3,568,130 | 3/1971 | Hurst | 339/30 |
| 3,718,750 | 2/1973 | Sayers | 174/94 R |
| 3,949,466 | 4/1976 | O'Brien | 228/115 X |
| 4,002,284 | 1/1977 | Suppus | 228/115 |

*Primary Examiner*—Donald G. Kelly
*Attorney, Agent, or Firm*—Sidney Greenberg

[57] ABSTRACT

A method for bonding a copper terminal member to an aluminum electrical conductor wire. The copper member, having a point at one end, is driven with its pointed end into the terminal end of the aluminum wire, so that a cold weld is produced between the aluminum and copper which forms a good electrical connection.

9 Claims, 7 Drawing Figures

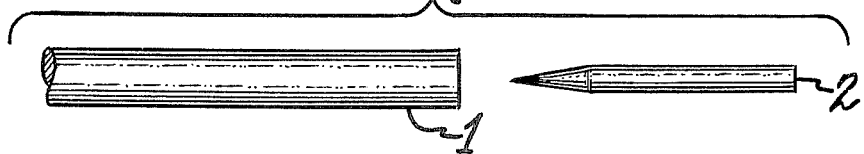
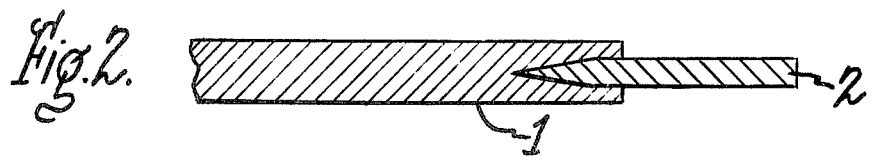
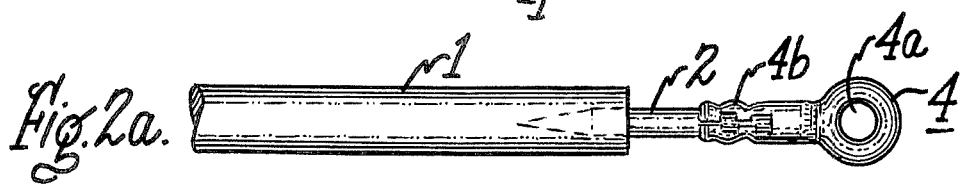

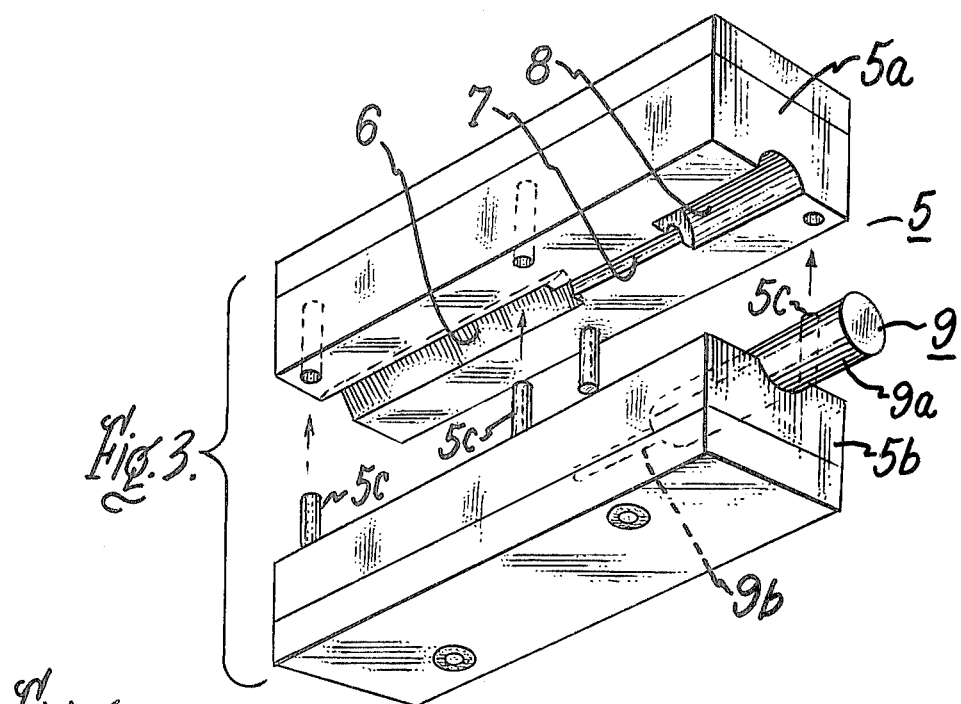
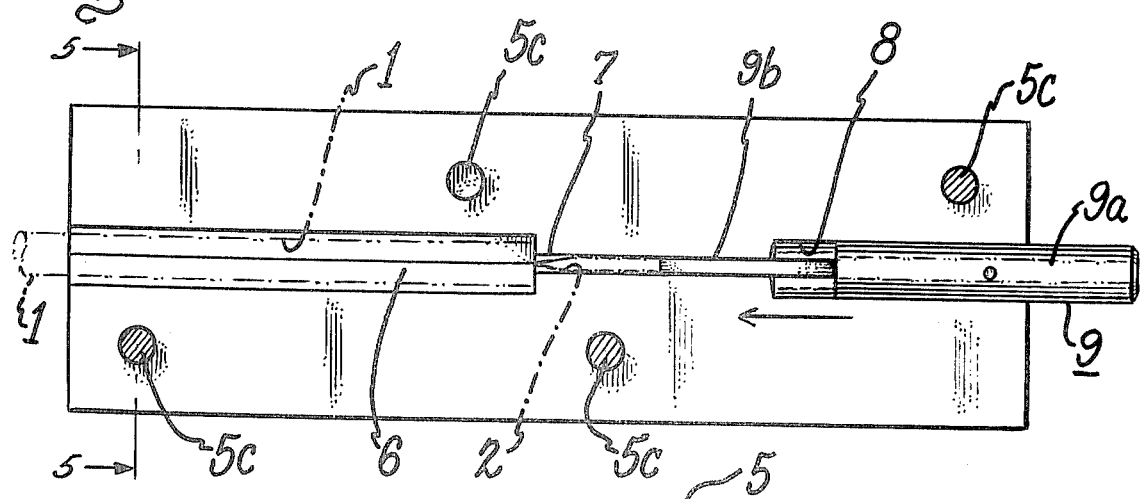
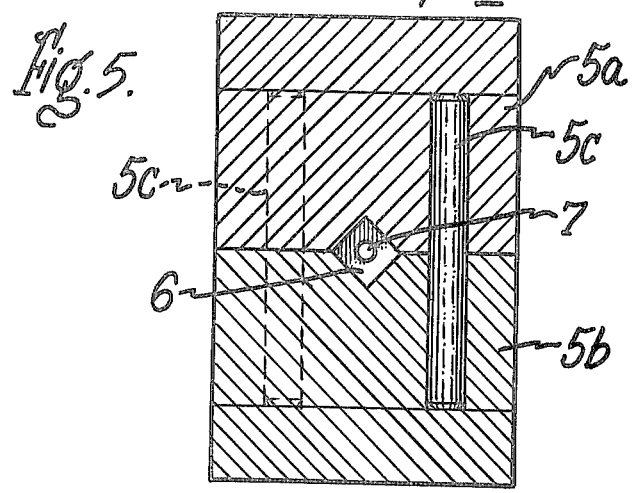

TERMINAL CONNECTION FOR ALUMINUM CONDUCTOR AND METHOD OF MAKING

The present invention relates to aluminum electrical conductors, and more particularly to terminal connections for aluminum wire.

Terminal connections (terminations) of aluminum conductors heretofore employed for various applications have not been as reliable as terminations conventionally used for copper conductors. This is due to a number of intrinsic properties of aluminum as compared to copper. For example, aluminum has a higher coefficient of thermal expansion and lower yield strength than iron, steel, brass or copper, which are normally used in making conventional electrical terminations, e.g., crimp connectors or screw connectors. In such known terminations, the conductor is held in compression. Where such connectors are used with aluminum wire, an increase in temperature causes increased compressive stress to be imposed on the aluminum due to its higher thermal expansion as compared to the terminal connector. This initially produces an elastic strain in the aluminum, and if the temperature excursion is sufficiently great, this is followed by a plastic strain (permanent deformation) in the lower yield strength aluminum. When the temperature drops, the deformed aluminum contracts more than the terminal connector, so that the aluminum conductor is no longer tightly held in the connector. As a result, electrical contact resistance across the joint is increased. After many temperature cycles, the aluminum conductor tends to become very loose in the connector, and the contact resistance can become sufficiently great to cause overheating and failure of the electrical connection.

Furthermore, when aluminum is exposed to air, a tenaciously adhering, highly insulating oxide is formed on its surface. The oxide film forms very rapidly when a fresh aluminum surface is exposed, as when aluminum is scratched with a sharp object. Accordingly, conventional types of terminations which do not disturb or deform the surface of the conductor upon installation do not provide good low resistance electrical connections.

It is an object of the invention to provide an improved aluminum electrical conductor termination which avoids the foregoing disadvantages of known aluminum terminations, and a method of maing such an improved aluminum termination.

Specifically, it is an object of the invention to provide an improved electrical termination or connection which comprises aluminum and a different metal such as copper characterized by a tight permanent joint of good electrical conductivity between the dissimilar metals.

Another object of the invention is to provide a simple, effective and inexpensive method of providing an aluminum termination of the above type.

Other objects and advantages will become apparent from the following description and the appended claims.

With the above objects in view, the present invention in one of its aspects relates to a method of making an electrical connection with a solid aluminum conductor which comprises forcing an electrical conducting metal member having a tapered portion into the solid aluminum conductor, so that the surface of the tapered portion which penetrates into the interior of the solid aluminum conductor is scraped clean by such forced penetration and forms thereby a cold welded joint with the contiguous substantially non-oxidized surface of the solid aluminum conductor.

The invention will be better understood from the following description taken in conjunction with the accompanying drawings, in which:

FIG. 1 is an exploded view of the termination components prior to being joined in accordance with the invention;

FIG. 2 is a cross-sectional view of the termination formed of the components shown in FIG. 1;

FIGS. 2a and 2b are views in elevation showing different forms of terminal connectors which may be employed with the termination device shown in FIG. 2;

FIG. 3 is an exploded view in perspective of a simple appartus which may be employed in carrying out the method of making an electrical termination in accordance with the invention;

FIG. 4 is a plan view of the lower part of the apparatus shown in FIG. 3; and

FIG. 5 is a cross-sectional view of the apparatus taken along the line 5—5 in FIG. 4.

Referring now to the drawings, and particularly to FIG. 1, there are shown a solid aluminum conductor wire 1 and a terminal number 2 formed of a pointed copper wire of smaller diameter than the aluminum wire, the respective wires being shown prior to their assembly to form a termination in accordance with the invention. FIG. 2 is a cross-sectional view of the termination which is produced by forcing the pointed copper wire 2 into the end face of aluminum wire 1 and in a direction along the length of the latter until the copper wire has penetrated a substantial distance into the aluminum wire.

In an illustrative case, aluminum wire 1 is of 103 mils diameter and copper wire 2 is of 50 mils diameter, and the copper wire is forced into the aluminum wire to a distance of about 90 mils. In general, with a particular cross-sectional area of the aluminum conductor, the copper terminal member is preferably selected to have a cross-sectional area which, in conjunction with its conductivity, will provide a conductive capacity equivalent to that of the aluminum conductor.

By virtue of forcing terminal member 2 into aluminum conductor 1 in accordance with the invention, a relatively high shear force is developed between the inserted copper wedge and the aluminum into which the wedge is forced. As a result, the surface contamination on the forward portion of the copper wedge (usually oxides) are removed and extremely clean copper is exposed to nonoxidized aluminum in the interior of the aluminum conductor. Moreover, a very high normal force is exerted bringing the two surface into tight engagement with one another due to the action of the progressing wedge. As a result, a cold weld is produced at the interface between the clean copper and aluminum which constitutes an excellent electrical junction.

A photomicrograph (not shown) taken at a magnification of 500x of the cold welded joint at the leading portion of the pointed copper wire 2 which has penetrated the aluminum wire 1 as shown in FIG. 2 (the aluminum in this case was an electrical grade (EC) aluminum #10 AWG wire and the copper was cold worked #15 AWG wire) reveals that a continuous welded joint is formed at the interface between the aluminum and copper, providing for direct passage of electrical current from one metal into the other through the weld joint. It has been found that this joint is stronger in tension than the aluminum itself.

The area of cold welding between the aluminum wire and the copper conductor may be increased or decreased by changing the angle of the copper point, by variations in configuration of the respective parts, and by varying the depth of penetration of the copper conductor into the aluminum wire.

To ensure proper penetration of the copper (or other metal terminal) wire into the aluminum wire, the metal terminal material should be of substantially greater yield strength (hardness) than the aluminum. The following table shows the yield strength of typical aluminum and other metals which may be used therewith for making terminations in accordance with the invention, the aluminum being annealed and the other metals being of cold worked type:

| Material | Yield Strength (lbs./in$^2$) |
| --- | --- |
| Aluminum, EC grade | 4,000 |
| Copper | 55,000 |
| Brass | 83,000 |
| Bronze | 75,000 |
| Carbon Steel | 110,000 |

The termination metals may additionally have a coating of tin, indium or other metals thereon which serve to facilitate their penetration into the aluminum and enhance the described cold welding between the two metals.

FIG. 3 is a perspective view of a simple device which may be employed to force a pointed copper member into an aluminum wire as described above. The device comprises a support block 5 comprising upper and lower parts 5a 5b which are held in assembly by dowels 5c. In assembly, block 5 defines a channel 6 (see FIG. 5), preferably of polygonal or non-circular cross-section, for securely holding an aluminum wire while providing space for receiving the aluminum displaced in the penetration process, a passage 7 of circular cross-section axially aligned with channel 6 (see FIG. 4) for holding a copper terminal member, passage 7 being substantially smaller in diameter than channel 6, and an enlarged circular recess 8 axially aligned with passage 7. Arranged in the aligned recess 8 and passage 7 is a slidable piston 9 having an enlarged circular rear portion 9a resting in recess 8 and a relatively thin circular front portion 9b extending into passage 7. The length of rear piston portion 9a is such that it projects rearwardly from support block 5 in all positions.

To make the terminal connection in accordance with the invention, an aluminum wire is placed in channel 6 with its end abutting the end of passage 7, a pointed copper member is placed in the forward portion of passage 7, and piston 9 is arranged in the position shown in FIG. 4. With the parts of support block 5 securely assembled, the block is placed in a vise (not shown) such that closing the vise will push piston 9 forwardly to force the pointed copper member into the end of the aluminum wire to the desired depth. The block is then removed from the vise, the parts disassembled, and the completed aluminum-copper termination removed.

FIG. 2a shows a terminal connector 4, which may be of brass, having an eye 4a at one end and a crimp portion 4b at its other end which may be used for connecting the described aluminum-copper termination to a screw terminal binding post of a receptacle or other electrical device to which the termination is to be connected.

FIG. 2b shows an alternative arrangement wherein the outer end of copper wire 2 is bent into an arc portion 2a for similar connection to a screw terminal.

As will be understood, the copper terminal member may, alternatively, have an eye portion integrally formed at its outer end for such terminal screw connection, suitable apparatus being provided for securely holding the thus formed copper member while forcing it into the aluminum wire conductor in the manner described above.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A method of making an electrical connection with a solid aluminum conductor which comprises forcing an electrical conducting metal member having a tapered portion into said solid aluminum conductor, so that the surface of said tapered portion which penetrates into the interior of said solid aluminum conductor is scraped clean by the friction of such formed penetration and forms thereby a cold welded joint with the contiguous substantially non-oxidized surface of said solid aluminum conductor.

2. A method as defined in claim 1, wherein said metal member has a hardness greater than said aluminum conductor.

3. A method as defined in claim 2, wherein said metal member is copper.

4. A method as defined in claim 2, wherein said metal member has a coating thereon of a metal selected from the group consisting of tin and indium.

5. A method as defined in claim 2, wherein said metal member is selected from the group consisting of steel, brass and bronze.

6. A method as defined in claim 3, said aluminum conductor and said copper member being in the form of wires, the diameter of the copper wire being smaller than the diameter of the aluminum wire and said tapered portion thereof forming a point.

7. A method as defined in claim 6, said aluminum wire having an end face, said pointed portion of said copper wire being forced into said aluminum wire through its end face in a direction along the length of said aluminum wire.

8. An electrically conductive joint made by the method defined in claim 1.

9. An electrically conductive termination device comprising a copper wire cold welded at one end to an aluminum wire by the method defined in claim 6, and terminal connecting means on the other end of said copper wire.

* * * * *